United States Patent [19]
Humbert

[11] 3,799,561
[45] Mar. 26, 1974

[54] VALVE HOLDING AND ALIGNING DEVICE

[75] Inventor: Marvin H. Humbert, Cedar Rapids, Iowa

[73] Assignee: Cedar Rapids Engineering Company, Cedar Rapids, Iowa

[22] Filed: May 2, 1972

[21] Appl. No.: 249,498

[52] U.S. Cl. ................................. 279/51
[51] Int. Cl. ............................... B23b 31/20
[58] Field of Search ............ 279/51, 52, 56, 47, 70, 279/1 F, 48, 69; 408/240

[56] References Cited
UNITED STATES PATENTS

| | | | |
|---|---|---|---|
| 2,360,907 | 10/1944 | Stoner | 279/51 |
| 268,340 | 11/1882 | Woerd | 279/51 X |
| 2,396,006 | 3/1946 | Hall | 279/1 F |
| 1,864,786 | 6/1932 | Wilkins | 279/51 |

FOREIGN PATENTS OR APPLICATIONS
552,735  12/1956  Belgium .................. 279/51

Primary Examiner—Gil Weidenfeld
Attorney, Agent, or Firm—Hill, Sherman, Meroni, Gross & Simpson

[57] ABSTRACT

A holding and aligning device for a valve which utilizes a rubber collet retained by a chuck shaft and in which the collet is mounted in a tapered socket and is biased by springs so as to clamp on the valve stem. A handle and lever is provided for releasing the collet by pivoting the handle. A plurality of springs normally bias the collet closed on the valve stem and the tension of the collet on the valve stem is adjustable by means for adjusting the total spring tension exerted on the collet.

5 Claims, 4 Drawing Figures

PATENTED MAR 26 1974 3,799,561

VALVE HOLDING AND ALIGNING DEVICE

BACKGROUND OF THE INVENTION

1. Field of the Invention

This invention relates in general to collets for machines and in particular to a releasable rubber collet.

2. Description of the Prior Art:

Collets have been utilized on machines for many years for holding tools such as drills and other devices and one form has comprised a plurality of movable jaws that are independently movable so as to grip and hold the support shaft of a tool.

SUMMARY OF THE INVENTION

The present invention comprises a holding collet for holding automotive type valves in proper alignment and attitude for griding seating faces. The gripping member comprises a rubber collet retained by a chuck shaft which has a tapered mating surface which engages the tapered surface of the chuck and a spring loaded cylindrical member is mounted on the chuck shaft and has engaging portions for engaging the rubber collet so as to force it into the tapered opening of the chuck shaft thus locking the stem of the valve to the collet and chuck shaft. The tension on the collet may be adjusted by threads between two portions of the cylindrical member which applies force to the collet and a handle and lever arrangement is movable from a first position wherein the collet is in the valve-holding position to a second position wherein the collet is released so that the valve may be removed from the collet.

Other objects, features and advantages of the invention will be readily apparent from the following description of certain preferred embodiments thereof taken in conjunction with the accompanying drawings, although variations and modifications may be effected without departing from the spirit and scope of the novel concept of the disclosure and in which:

DESCRIPTION OF THE PREFERRED EMBODIMENTS

Figure 1:
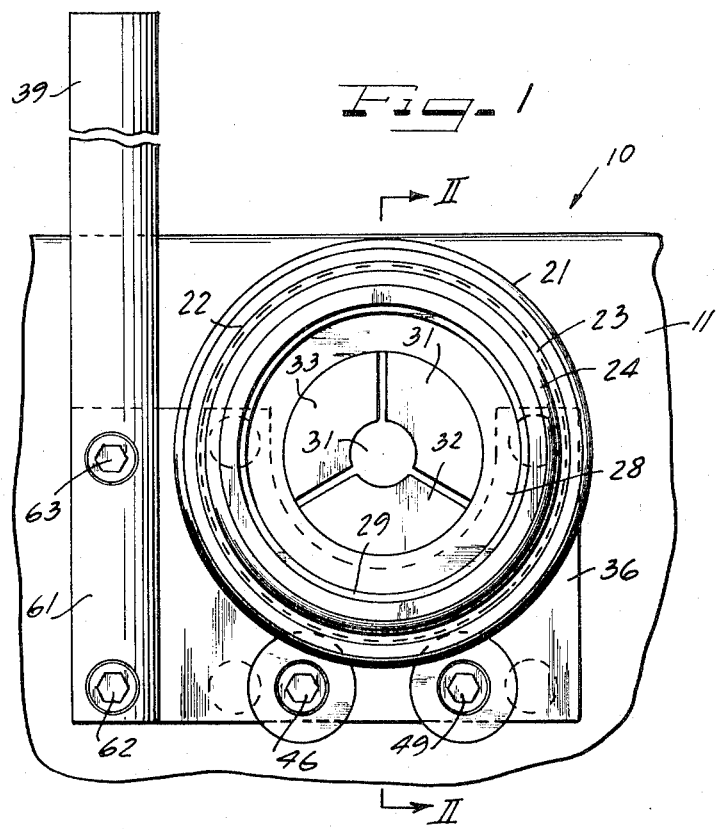
FIG. 1 is a front plan view looking into the collet.

The device for holding valves so that they are properly aligned and in the correct attitude for regrinding the seating faces is illustrated in the figures. A machine designated generally as 10 includes a housing 11 in which a driving means and bearings are mounted for driving and supporting a chuck shaft 15 which extends from the housing 11. The chuck shaft 15 is formed with an enlarged portion 12 which extends outwardly from the housing 11 and which has an outwardly tapered portion 14 with a tapered surface 17. A shoulder 16 is formed on the side of the portion 14 facing the housing 11 and a plurality of springs illustrated in FIG. 2 and designated by the numerals 18 and 20 are mounted in spring cages 25 and 30. There might for example be eight springs spaced about the member 14.

A threaded sleeve 19 has an inner surface against which the springs 18 and 20 bear and has a threaded portion 21 engageable with a cylindrical member 22 which is formed with threads 23. The sleeve member 22 fits over the portion 14 of member 12 and an annular collet pushing member 26 has a collet engaging portion 27 for engaging the blades 31, 32 and 33 of the collet so as to close it on a valve stem through its central opening 13 by wedging the tapered surfaces 17 of the collet blades into the tapered portion 14 against the surface 17.

An actuating plate 36 is pivotally attached by bolts 46 and 47 to the housing 11 and pass through openings formed in the plate 36 which are large enough to allow the plate to pivot relative to the housing. Springs 48 and 49 are mounted under the heads of bolts 46 and 47, respectively, so as to normally bias the actuating plate 36 against the housing 11. A handle 39 is attached to the plate 36 by bolts 62 and 63. The side of the actuating plate 36 adjacent the housing 11 is formed with pivot projections 43 and 44. The plate 36 is formed with upwardly extending portions 41 and 42 which extend around the shaft 12 behind the portion 19. Bearing projections 37 and 38 are formed respectively on the portions 41 and 42 and bear against the member 19 so as to move it to the right relative to the FIGS. 2 and 4.

Figure 2:
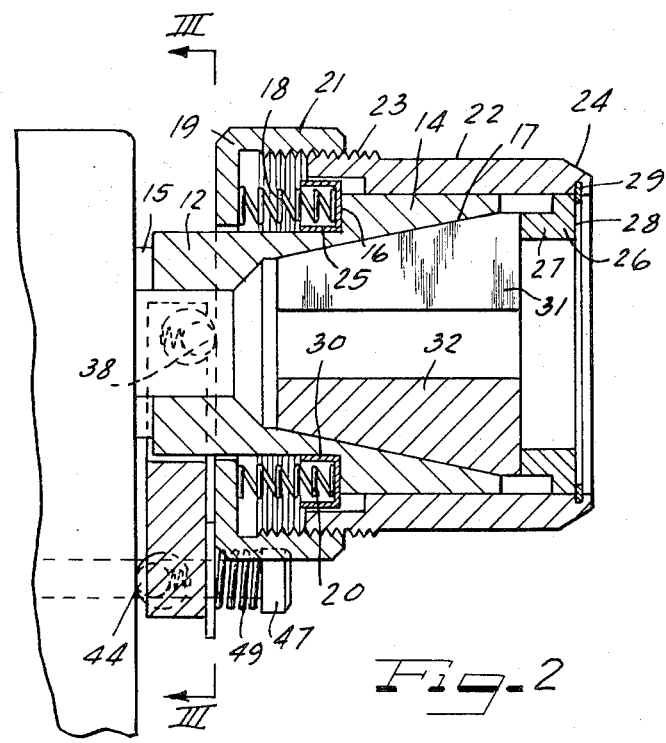
FIG. 2 is a sectional view taken on line II—II of FIG. 1.
Figure 3:
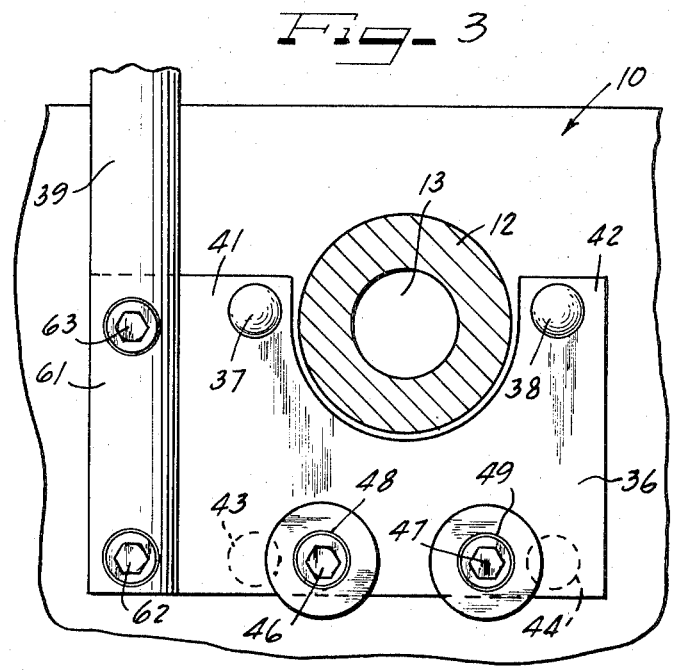
FIG. 3 is a front sectional view taken on line III—III of FIG. 2.

When the handle 39 is in the vertical position illustrated in FIG. 2 the springs 18, 20 and the other springs which are similarly placed about the periphery of the collet push the members 19, 22 and the collet actuating ring 27 against the collet fingers 31, 32 and 33, so as to force them to the left relative to FIG. 2, thus moving the collet fingers 31, 32 and 33 inwardly due to the camming action of the surfaces 17 and the tapered outer surfaces of the collet fingers to clamp the stem of a valve which has been inserted into the collet.

In a particular model circuit of this invention the radial movement of the collet was 0.100 inch and for this radial movement the lateral travel of collect fingers 31 was 0.25 inch.

The springs 18 and 20 determine the force with which the collet fingers grip the valve stem or other shaft within the collet and this may be adjusted by varying the compression on the spring with the threaded arrangement between members 19 and 22. In other words, if greater spring tension is desired so as to exert more force on the collet fingers the member 19 may be rotated relative to the member 22 so as to compress the springs 18 and 20, as well as the other springs similarly spaced. On the other hand the spring tension may be decreased by rotating the member 19 relative to the member 22 so that the threaded portions 21 and 23 decrease the tension on the springs 18 and 20 and the other springs.

Figure 4:
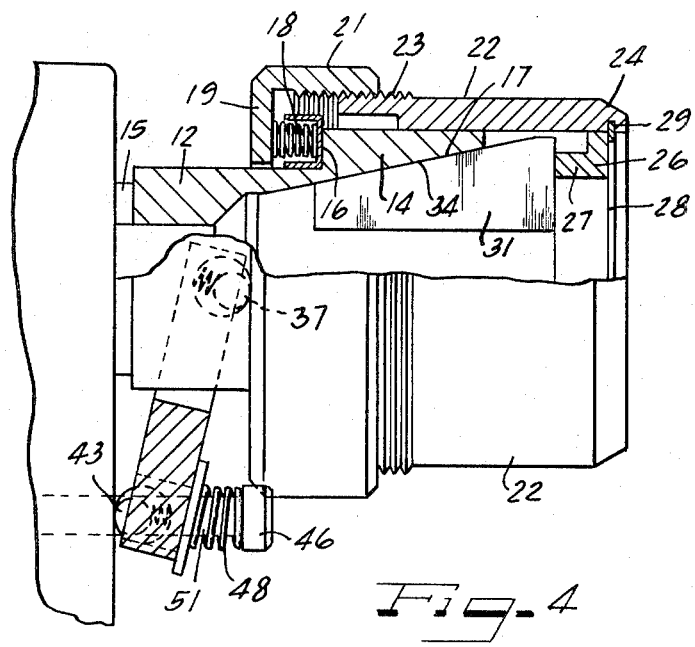
FIG. 4 is a partial cut-away view showing the collet in the released position.

FIG. 4 illustrates the handle 39 in the released position wherein the plate 36 has been moved to pivot on the bolts 46 and 49 thus forcing the collet tightening members to the right thus moving the collet engaging portion 27 to the right against the springs 18 and 20 allowing the collet fingers 31, 32 and 33 to move up the tapered surface 17 releasing tension on the valve shaft within the collet. A new shaft may be placed into the collet and the handle 39 released to allow the collet holding tightening arrangement to return to the position illustrated in FIG. 2 wherein the springs 18 and 20 move the collet tightening sleeve including the members 19, 22 and 27 to the left relative to FIG. 2 thus causing the member 27 to force the collet fingers 31, 32 and 33 into the tapered socket 17 thereby tightening the collet on the shaft.

The present invention allows a shaft to be quickly clamped in the collet such that it is accurately aligned and firmly held and quickly released by moving the handle 39 so as to depress the springs 18 and 20 thus releasing the collet's grip upon the shaft. The collet accurately aligns the shaft held within the collet due to the accuracy of the tapered surfaces 17 and the device may be used for facing valves or other operations requiring high precision. The threaded connection between the portions 23 and 21 allows the spring tension to be adjusted such that the clamping action can be adjusted as desired.

Although minor modifications might be suggested by those versed in the art, it should be understood that I wish to embody within the scope of the patent warranged hereon all such modifications as reasonably and properly come within the scope of my contribution to the art.

Retainer ring 29 locks the member 27 to 22.

I claim:

1. An aligning and gripping collet for a machine with a drive shaft comprising: a conical opening formed in the outer end of said drive shaft; a tapered collet received in said conical opening; means for applying axial force to said ollet comprising a cylindrical member which fits over said drive shaft and is movable longitudinally thereof and which has a collet engaging portion at one end which engages said collet to urge it into said conical opening, said drive shaft formed with a shoulder and cylindrical member has a sleeve, a plurality of compression springs mounted between said shoulder and said sleeve to bias said cylindrical member in the axial direction relative to said drive shaft, spring cages mounted between said shoulder and said sleeve to position said springs, and a handle attached to said machine and engageable with said cylindrical member to move it axially relative to said drive shaft.

2. An aligning and gripping collet according to claim 1 wherein said sleeve is adjustably attached to said cylindrical member so that the tension on said compression springs can be adjusted.

3. An aligning and gripping collet according to claim 2 wherein said sleeve and cylindrical member are threaddedly attached.

4. An aligning and gripping collet according to claim 1 comprising a plate to which said handle is attached and supported from said machine for pivotal movement and having a pair of projections which are engageable with said cylindrical member.

5. An aligning and gripping collet according to claim 4 wherein said plate is attached to said machine by bolts which loosely extend through openings in the plate and including spring means between said bolts and said plate.

* * * * *